(12) United States Patent
Fujii et al.

(10) Patent No.: US 7,673,905 B2
(45) Date of Patent: Mar. 9, 2010

(54) LOCK DEVICE OF SLIDING MECHANISM

(75) Inventors: Daisuke Fujii, Saitama (JP); Miki Mori, Saitama (JP); Yasuki Motozawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 11/705,560

(22) Filed: Feb. 12, 2007

(65) Prior Publication Data

US 2007/0216149 A1 Sep. 20, 2007

(30) Foreign Application Priority Data

Mar. 14, 2006 (JP) ............... 2006-069414

(51) Int. Cl.
*B60R 22/46* (2006.01)
*B60R 22/195* (2006.01)
(52) U.S. Cl. ............ 280/806; 280/807; 280/808
(58) Field of Classification Search ........ 280/801.1, 280/801.2, 807, 803, 804, 805, 806, 808; 248/429, 430; 297/473
See application file for complete search history.

(56) References Cited

U.S. PATENT DOCUMENTS 3,631,419 A * 12/1971 Ho ............... 360/266.2
3,714,843 A * 2/1973 Bracey ........... 74/527
2003/0029661 A1 * 2/2003 Motozawa ........ 180/274

FOREIGN PATENT DOCUMENTS

JP 2001-113995 4/2001

* cited by examiner

*Primary Examiner*—Ruth Ilan
*Assistant Examiner*—Keith Frisby
(74) *Attorney, Agent, or Firm*—Carrier, Blackman & Associates P.C.; William D. Blackman; Joseph P. Carrier

(57) ABSTRACT

In a lock device of a sliding mechanism, a pair of locking claws provided on a moving member are brought into resilient engagement with locking grooves of a locking groove group, whereby downward sliding of the moving member is permitted but upward sliding thereof is locked. The distance between the locking claws is longer than distance between the locking grooves, so that the moving member becomes locked against upward sliding at an interval smaller than the distance between the locking grooves. Thus, the moving member adapted to slide in one (downward) direction along a guide rail can be reliably locked against movement in the opposite (upward) direction at a very small interval.

4 Claims, 8 Drawing Sheets

FIG.8

LOCK DEVICE OF SLIDING MECHANISM

CROSS-REFERENCE TO RELATED APPLICATIONS

The present invention claims priority under 35 USC 119 based on Japanese patent application No. 2006-69414, filed on Mar. 14, 2006. The subject matter of this priority document is incorporated by reference herein.

BACKGROUND OF THE INVENTION

1. Field of the Invention

The present invention relates to a lock device of a sliding mechanism, in which in order to provide a unidirectional moving property to a moving member adapted to slide in one direction along a guide rail, sliding of the moving member in the opposite direction can be locked at a very small interval.

2. Description of the Related Art

Japanese Patent Application Laid-open No. 2001-113995 discloses a lock device of a sliding mechanism, in which a moving member is adapted to slide along a fixed guide rail and may be locked in numerous positions on the guide rail.

In the lock device disclosed in Japanese Patent Application Laid-open No. 2001-113995, a series of locking holes are provided in the guide rail, and a plurality of locking claws are provided on a locking plate mounted on a runner adapted to slide along the guide rail. In a locking-off state of the locking plate, the locking claws are separated from the locking holes to permit free sliding of the runner. In a locking-on state of the locking plate, the locking claws are inserted into and engaged in the locking holes by an offsetting force of a locking spring to lock the runner in various positions on the guide rail.

However, in the lock device disclosed in Japanese Patent Application Laid-open No. 2001-113995, the distance between the locking holes and the distance between the locking claws inserted into and engaged in the locking holes are set to be equal to each other. Therefore, a locking interval of the runner (moving member) is restricted by the distance between the locking holes, leading to a problem that the runner (moving member) cannot be locked at an interval smaller than the distance between the locking holes.

SUMMARY OF THE INVENTION

Accordingly, it is an object of the present invention to provide a novel lock device for a sliding mechanism, wherein a moving member adapted to slide in one direction along a guide rail is locked at a smaller interval in sliding in the opposite direction than is possible with conventional lock devices for sliding mechanisms.

In order to achieve the above object, according to a first feature of the present invention, there is provided a lock device of a sliding mechanism, comprising: a guide rail; a moving member adapted to slide in one direction along the guide rail; at least a pair of locking members provided with the moving member; and a group of locking grooves arranged in a sliding direction of the moving member; the locking members selectively engaging with different ones of the locking grooves to lock the moving member in various engagement positions, when the moving member slides in an opposite direction along the guide rail, wherein a distance between the pair of locking members is longer than a distance between adjacent ones of the locking grooves such that the moving member becomes locked in one of the engagement positions on the guide rail after moving an interval smaller than the distance between the locking grooves in the opposite direction.

In order to achieve the above object, according to a second feature of the present invention, there is provided a lock device of a sliding mechanism, comprising: a guide rail; a moving member adapted to slide in one direction along the guide rail; at least a pair of locking members provided with the moving member; and at least a pair of groups of locking grooves each arranged in a sliding direction of the moving member and respectively corresponding to the locking members; the locking members selectively respectively engaging with locking grooves of the corresponding locking groove group to lock the moving member in various engagement positions when the moving member slides in an opposite direction along the guide rail, wherein the pair of locking members and the locking grooves of the pair of locking groove groups are staggered from each other in a lengthwise direction of the pair of locking groove groups within a distance between adjacent ones of the locking grooves such that the moving member becomes locked in one of the engagement positions on the guide rail after moving an interval smaller than the distance between the locking grooves in the opposite direction.

In order to achieve the above object, according to a third feature of the present invention, in addition to the first or second feature, the moving member includes a retractor of a seat belt device of a vehicle.

With each of the first and second features of the present invention, in the lock device of the sliding mechanism, the moving member adapted to slide in one direction along the guide rail can be reliably locked at a smaller interval in sliding in the opposite direction than has been possible with conventional lock devices for sliding mechanisms.

With the third feature of the present invention, the retractor slidably mounted in the seat belt of the vehicle can be locked at a smaller interval than previously possible.

The above and other objects, features and advantages of the invention will become apparent from the following description of present embodiments taken in conjunction with the accompanying drawings.

DETAILED DESCRIPTION OF PRESENT EMBODIMENTS

A first embodiment of the present invention will be described with reference to FIGS. 1 to 5.

Figure 1:
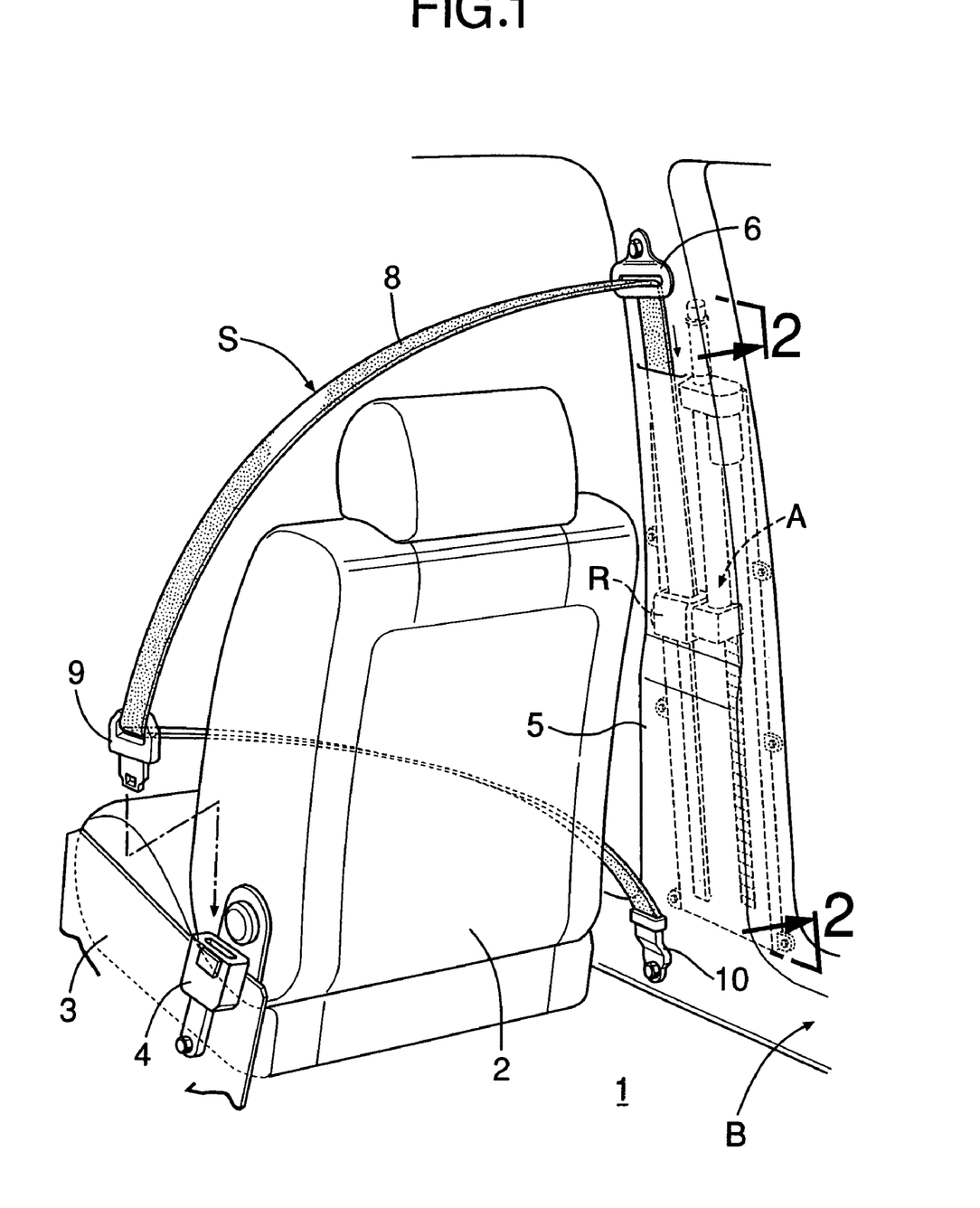
FIG. 1 is a perspective view of a seat belt device of a vehicle, which includes a lock device of a sliding mechanism according to a first embodiment of the present invention.

Referring to FIG. 1, a seat 2 is provided on a floor panel 1 constituting a portion of a vehicle body B, and is equipped with a seat belt device S.

At a lower portion on one side of the seat 2, a buckle 4 is mounted on a support frame 3 above the floor panel 1. A shoulder through-anchor 6 is mounted at an upper portion of a center pillar 5. A buckle plate 9 is slidably mounted on the seat belt 8 so that it can disengageably engage with the buckle 4. The seat belt 8 is slidably carried in the shoulder through-anchor 6. Below the shoulder through-anchor 6, a retractor R is supported on the center pillar 5 so that it can vertically slide as described later. The seat belt 8 is attached at its one end to the retractor R and wound into the retractor R so that it can be drawn out of the retractor R. The seat belt 8 drawn out of the retractor R is passed through the shoulder through-anchor 6 and the buckle plate 9, and fastened to a fixing member 10 mounted on the vehicle body B at a lower portion on the other side of the seat 2.

A conventionally known lock mechanism 11 for prohibiting drawing-out of the seat belt 8 upon generation of a shock is built in the retractor R.

The structure of a lock device (see FIG. 4) of a slide mechanism according to the present embodiment will be described below with reference to FIGS. 2 to 5.

A base plate 15 for mounting the lock device of the slide mechanism according to the present embodiment on a lower half of the center pillar 5 is fixed to the center pillar 5. A guide rail 16 having a non-circular "dovetail" shaped cross section is integrally provided in the base plate 15 so as to extend in a lengthwise direction (a vertical direction) of the base plate 15. The guide rail 16 is slidably fitted in a guide groove having a "dovetail groove" shaped cross section and provided in a moving member 17 which is housed in the center pillar 5. Thus, the moving member 17 can vertically slide along the guide rail 16. The retractor R is integrally fixed to the moving member 17. The moving member 17 includes a hollow portion having the guide groove formed therein and also housing the retractor R therein, and a locking portion 17a which is integrally and fixedly attached to the hollow portion. In the embodiment of FIGS. 2-5, the locking portion 17a includes a block body having a pair of spaced-apart recesses 22, 22 formed therein to each slidably receive a respective locking member 21. The moving member 17 constitutes an inertia mass member, which is slidable along the guide rail 16 along with the retractor R.

Figure 2:
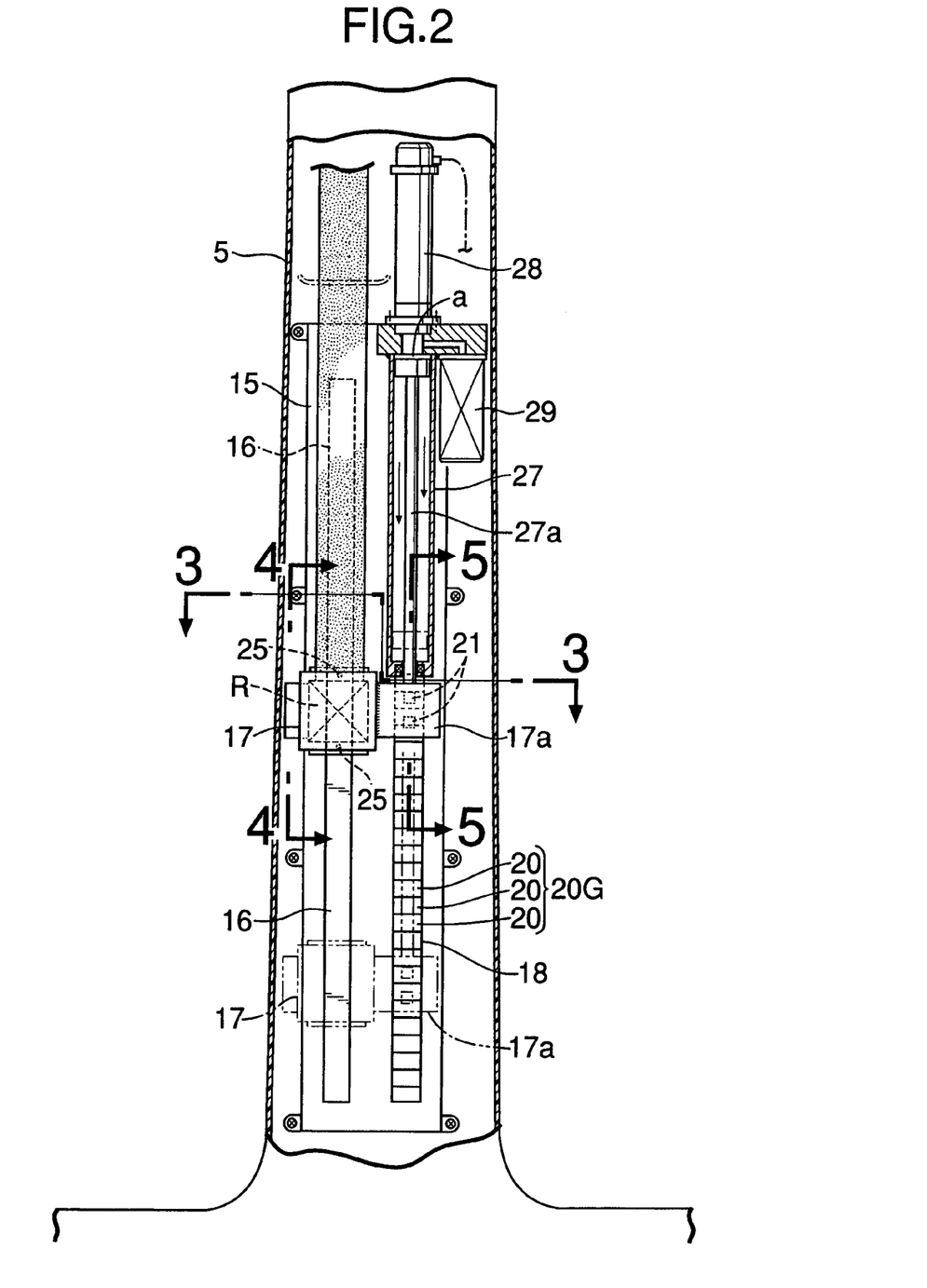
FIG. 2 is an enlarged sectional view taken along a line 2-2 in FIG. 1.
Figure 3:
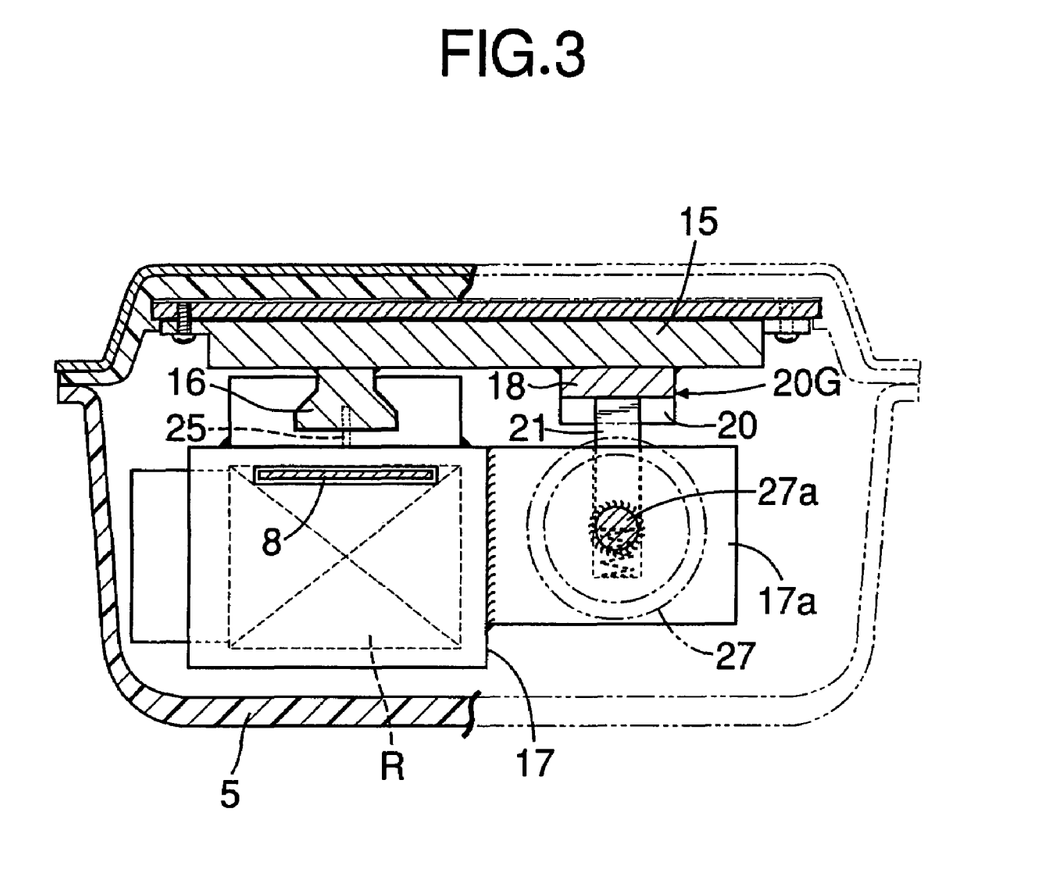
FIG. 3 is an enlarged sectional view taken along a line 3-3 in FIG. 2.
Figure 5:
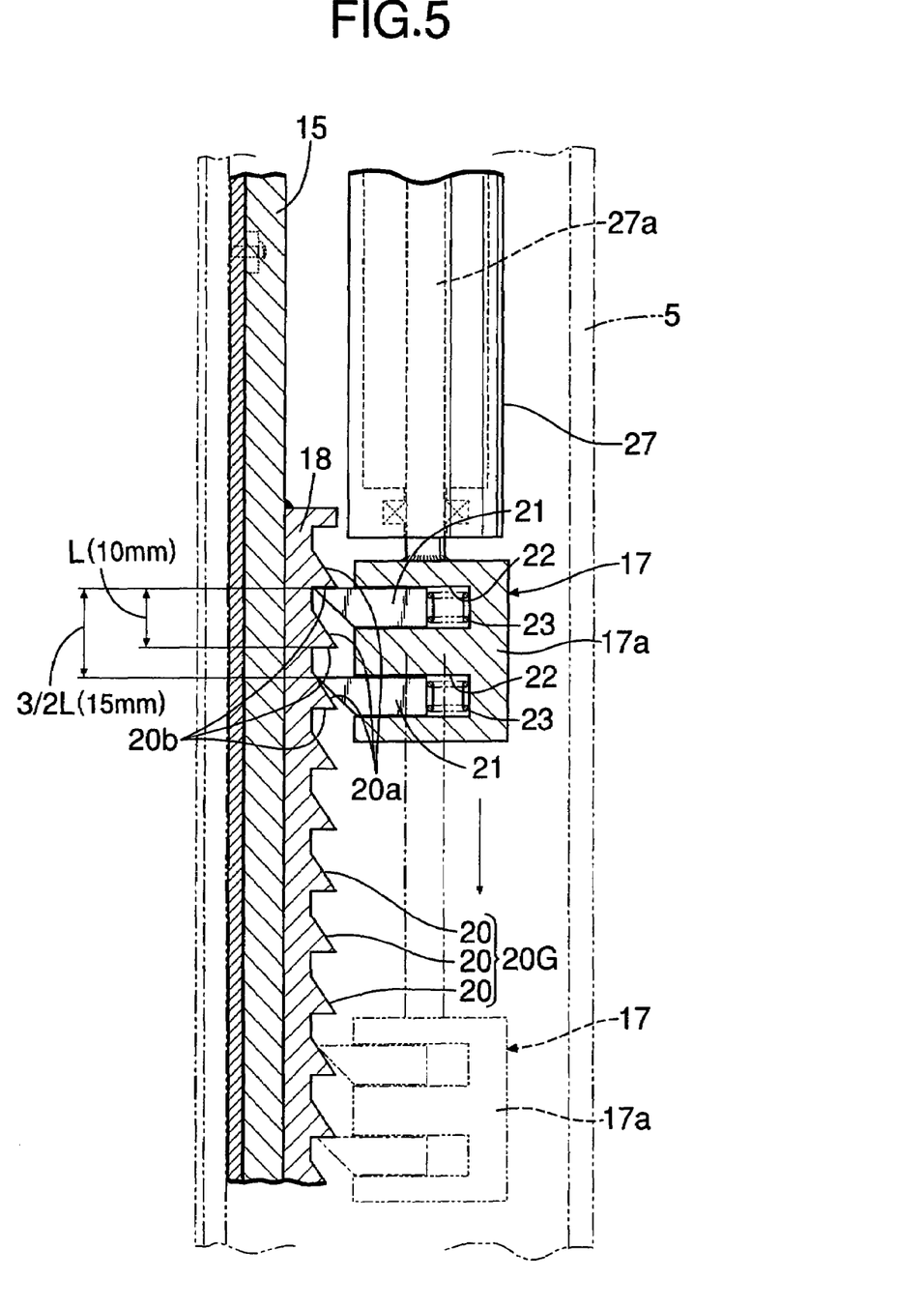
FIG. 5 is an enlarged partial sectional view taken along a line 5-5 in FIG. 2.

As shown in FIGS. 2, 3 and 5, a vertically elongated locking member 18 is integrally provided on the base plate 15 in parallel to the guide rail 16. A serrated locking groove group 20G comprising a plurality of locking grooves 20 is provided in the locking member 18 so that the locking grooves 20 are arranged in a line in a vertical direction. Each locking groove 20 is formed into a latchet-shape having an inclined slide face 20a and a locking face 20b in order to permit sliding of a locking member or claw 21, which will be described later, in one direction and to intermittently inhibit the sliding of the locking member 21 in the other direction.

On the other hand, the moving member 17 is integrally provided with a locking portion 17a which is offset to one side of the retractor R and extends toward the locking groove group 20G. Locking claws 21, 21 serving as a pair of the locking members are provided on a surface of the locking portion 17a opposed to the locking groove group 20G so that the locking claws 21, 21 can advance and retreat relative to the locking groove group 20G at a vertical distance from each other. Namely, as shown in FIG. 5, the locking claws 21, 21 are accommodated within two recesses 22, 22 spaced vertically apart in the locking portion 17a so as to advance and retreat, and are resiliently urged by spring members 23, 23 mounted respectively within the recesses 22, 22 so as to selectively come into engagement with the plurality of locking grooves 20. Thus, the locking claws 21, 21 are permitted to slide downwards, while being engaged with the inclined faces 20a, 20a of the locking grooves 20, 20, but prevented from sliding upwards by engagement with the locking faces 20b, 20b of the locking grooves 20, 20. Therefore, the moving member 17 is permitted to slide downwards along the guide rail 16 along with the retractor R, but intermittently inhibited from sliding upwards.

As shown in FIG. 5, the distance (pitch) between the pair of locking claws 21, 21 of the moving member 17 is larger than the distance (pitch) between the locking grooves 20, 20 of the locking groove group 20G. Specifically, the distance between the pair of locking claws 21, 21 is set at 3/2L (for example, 15 mm) of the distance L (for example, 10 mm) between the locking grooves 20, 20. Therefore, when the moving member 17 is locked and prevented from sliding upwards relative to the guide rail 16, any one of the pair of locking claws 21, 21 can be locked with the locking face 20b of the locking groove 20 at a distance (the maximum distance: ½L) smaller than the distance L between the locking grooves 20, 20. As a result, the moving member 17 is locked at a distance smaller than the distance L between the locking grooves 20, 20, and prevented from sliding upwards little at a time.

Figure 4:
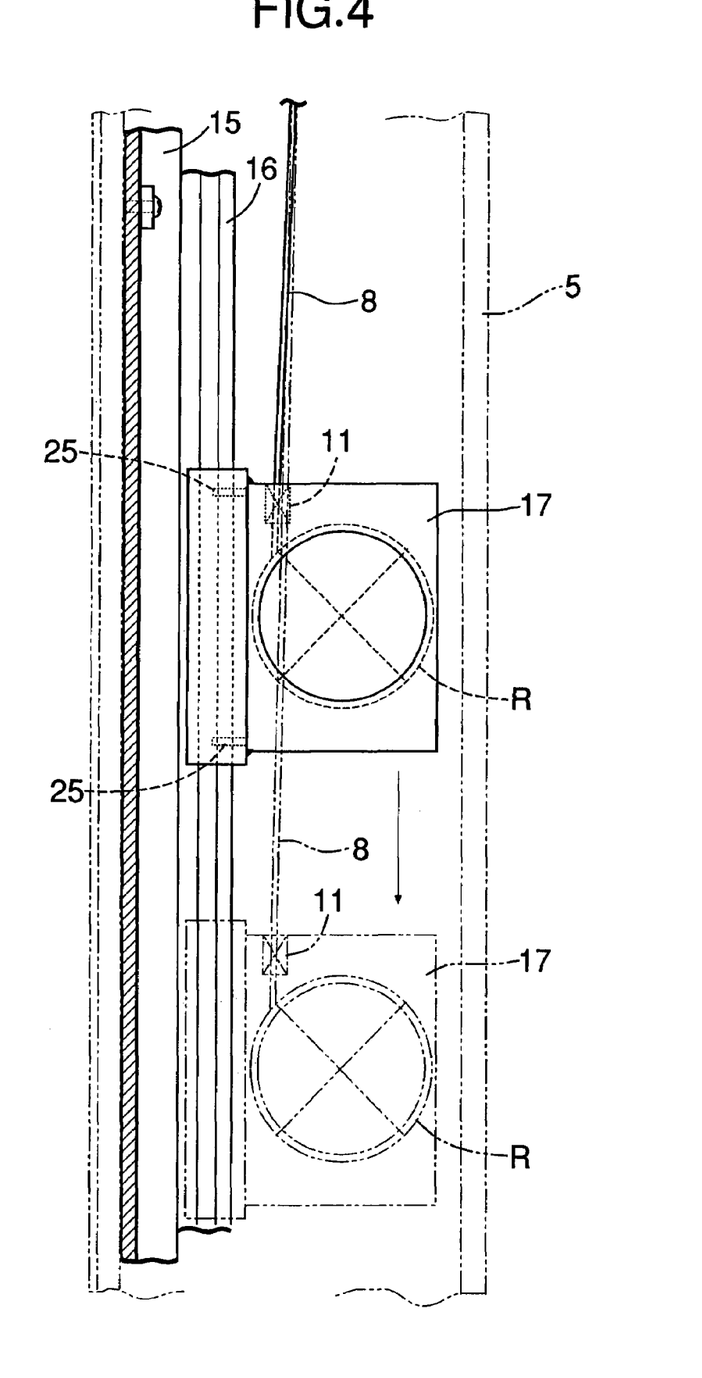
FIG. 4 is an enlarged partial sectional view taken along a line 4-4 in FIG. 2.

The moving member 17 provided with the retractor R is locked in a set position on the guide rail 16. In this embodiment, as shown in FIG. 4, the moving member 17 is connected through a shear pin 25 to the guide rail 16. When the shear pin 25 is broken by the operation of an actuator A which will be described later, the moving member 17 can slide downwards along the guide rail 16.

The actuator A for forcibly sliding the moving member 17 downwards along with the retractor R is mounted on the base plate 15. The actuator A includes, as shown in FIG. 2, an air cylinder 27 vertically extending in parallel to the guide rail 16, an inflator 28 mounted at an upper portion of the air cylinder 27 to supply a gas energy into an air chamber a in an upper portion of the air cylinder 27 to expand the air cylinder 27, and an accumulator 29 communicatingly connected to the air chamber a. The locking portion 17a of the moving member 17 is connected to a lower end of a piston rod 27a of the air cylinder 27.

The inflator 28 is connected to a shock detecting means (not shown) mounted in place on the vehicle body B. The shock detecting means is operated when it detects a shock which meets predetermined conditions, thereby outputting a shock detection signal to the inflator 28 to operate the inflator 28.

The operation of the first embodiment will be described below.

When a shock force acts on the vehicle body due to a collision accident during traveling of the vehicle, and a shock input enters the actuator A, the inflator 28 is actuated and a gas energy output from the inflator 28 is stored in the accumulator 29. The gas energy from the accumulator 29 causes the air cylinder 27 to expand, whereby the piston rod 27a of the air cylinder 27 is pushed downwards to apply a downward urging force to the moving member 17 connected to the piston rod 27a. This breaks the shear pin 25 which has locked the moving member 17 to the guide rail 16, so that the moving member 17 performs a regular sliding along with the retractor R in a downward direction along the guide rail 16. Because the seat belt 8 is attached to the retractor R, a predetermined tension can be applied to the seat belt 8. At this time, the moving member 17 receives a reverse, i.e., upward rebounding force due to the tension applied to the seat belt 8, but the reverse upward sliding of the moving member 17 is inhibited at a very small interval by the engagement between the locking claw 21 and the locking groove 20. Therefore, the reverse upward sliding of the retractor R can be locked at a short interval, and a clearance between an occupant and the seat belt 8 can be reduced, thereby improving the restrained state of the occupant.

The gas energy generated by the ignition of the inflator 28 can be temporarily stored by the accumulator 29. Therefore, the air cylinder 28 is continued to expand for a period of time longer than the burning time of the inflator 28, thereby providing the tension applied to the seat belt 8 over a long period of time.

A second embodiment of the present invention will now be described with reference to FIGS. 6 and 7 wherein components same as those of the first embodiment are denoted by the same reference numerals.

A pair of left and right locking members 118, 118 vertically extending in parallel to each other are fixed to a base plate 15 fixed to a center pillar 5. Locking groove groups 120G, 120G are formed in the locking members 118, 118, respectively. Each locking groove group 120G comprises a plurality of serrated locking grooves 120 arranged in a line as in the first embodiment. The distances L (e.g. 10 mm) between the locking grooves 120, 120 of the left and right locking groove groups 120G, 120G are the same, but the locking grooves 120, 120 of the left and right locking groove groups 120G, 120G are vertically staggered from each other by ½L (a half pitch). On the other hand, a pair of locking members, i.e., locking claws 121, 121 are provided in the locking portion 17a of the moving member 17 so that they are opposed to the pair of left and right locking groove groups 120G, 120G, respectively. The locking claws 121, 121 are resiliently urged toward the locking groove groups 120G, 120G by a spring member 23, as in the first embodiment. The pair of locking claws 121, 121 are positioned at the same lengthwise positions in the pair of locking groove groups 120G, 120G, respectively.

Also in the lock device of the second embodiment, the moving member 17 can perform the regular sliding in one direction, i.e., in the downward direction as in the first embodiment, but the reverse sliding of the moving member 17 in the other direction, i.e., in the upward direction is locked by the engagement between the locking claws 121, 121 and the locking grooves 120, 120. Because the distances L between the locking grooves 120, 120 of the left and right locking groove groups 120G, 120G are vertically staggered from each other by the half pitch ½L, any one of the left and right locking claws 121, 121 is locked at up to ½ distance (half pitch), i.e., ½L by one of the left and right locking grooves 120, 120, when the moving member 17 slides regularly in the upward direction. Therefore, the moving member 17 is prevented from reversely sliding at a short interval, as in the first embodiment.

Figure 6:
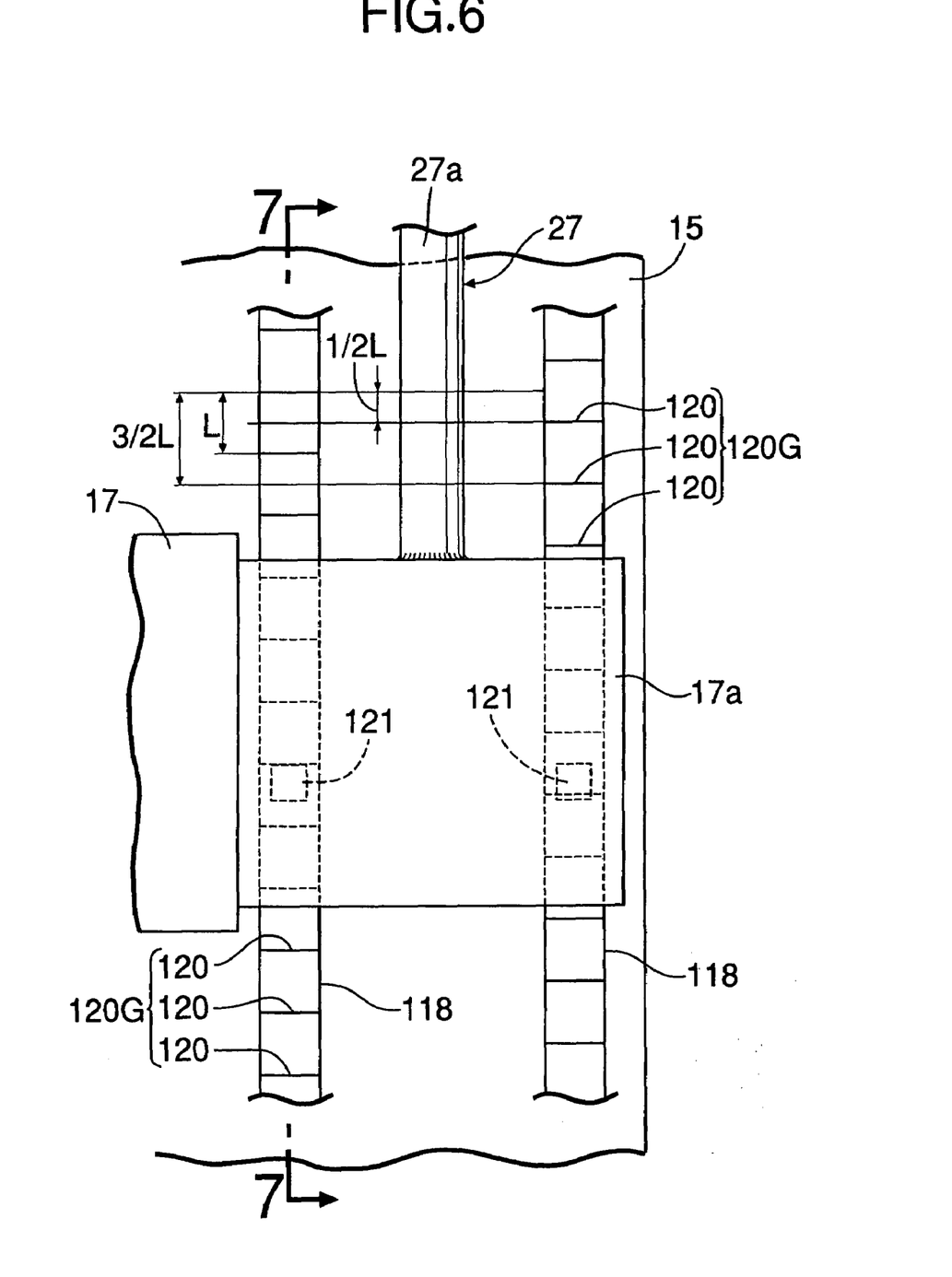
FIG. 6 is a view partially showing an essential portion of a lock device of a sliding mechanism according to a second embodiment of the present invention.
Figure 7:
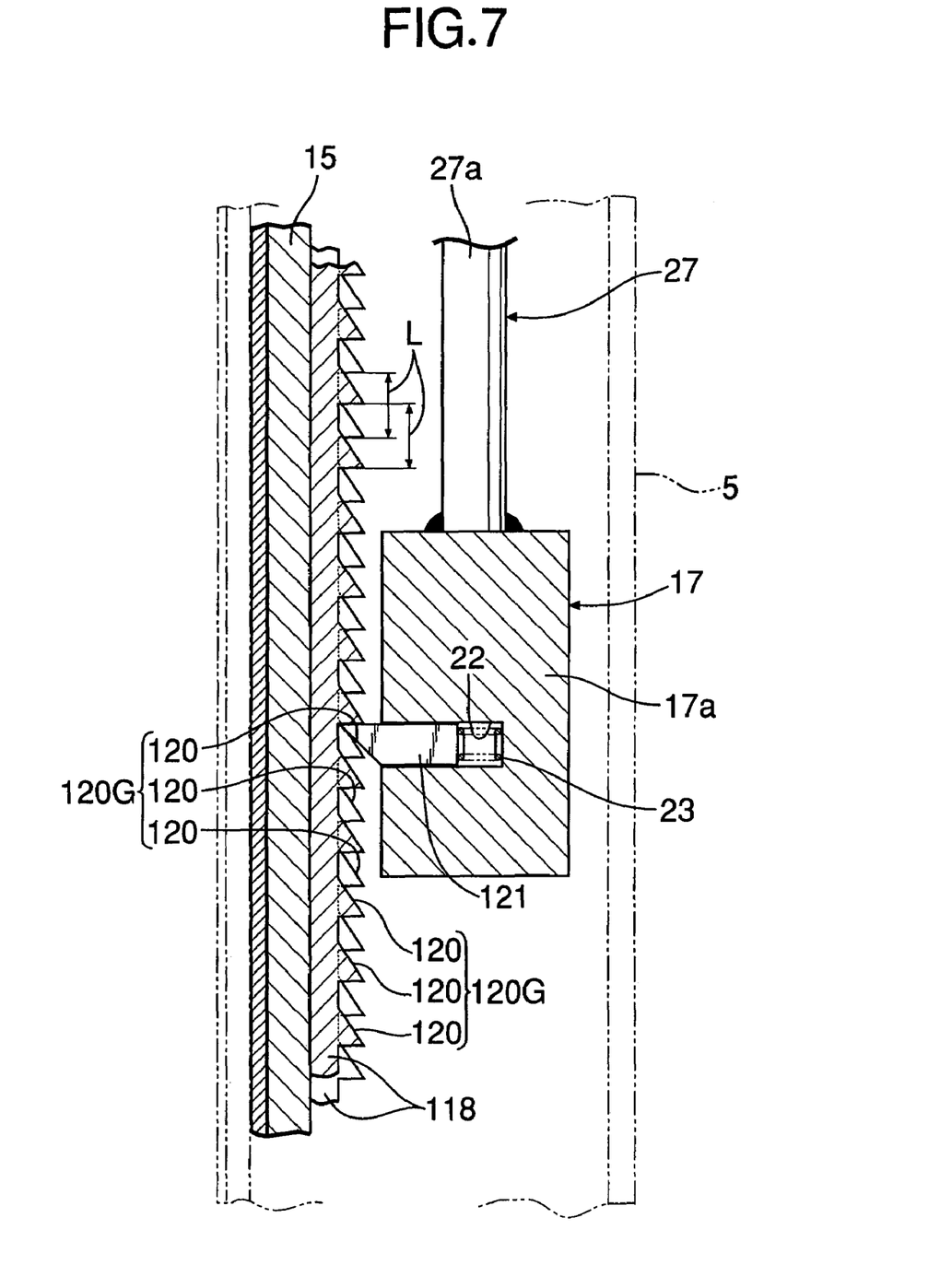
FIG. 7 is an enlarged sectional view taken along a line 7-7 in FIG. 6.
Figure 8:
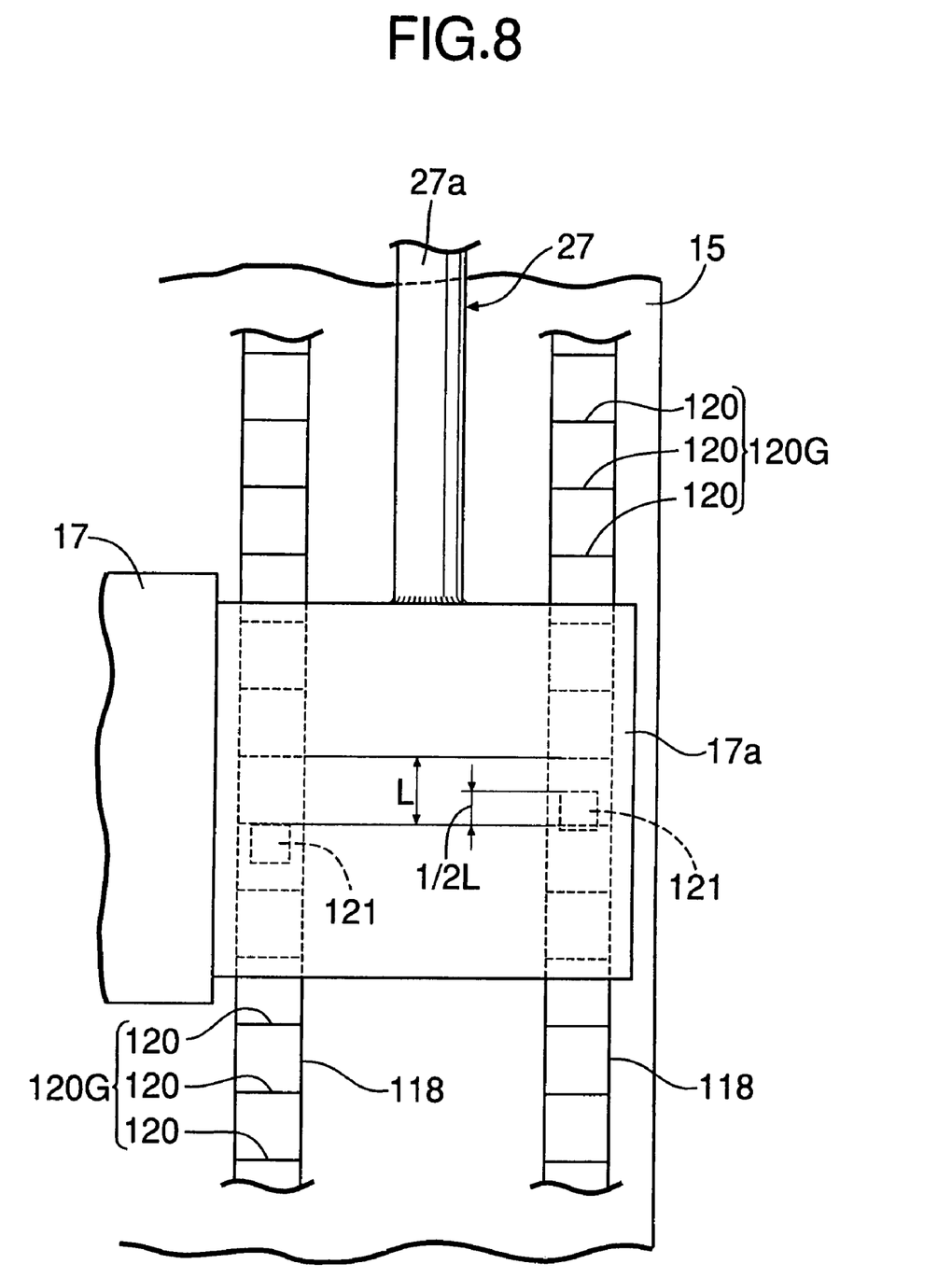
FIG. 8 is a view partially showing an essential portion of a lock device of a sliding mechanism according to a modification to the second embodiment of the present invention.

A modification to the second embodiment will be described below with reference to FIG. 8 which is a view similar to FIG. 6 showing the second embodiment and partially showing an essential portion of a lock device of a sliding mechanism.

In this modification, both left and right locking grooves 120 in locking groove groups 120G, 120G formed respectively in left and right locking members 118, 118 extending vertically in parallel to each other are positioned at the same level, i.e., in the vertically same phase. The distance (pitch) L (e.g., 10 mm) between the left and right locking grooves 120, 120 is set at the same value as that in the second embodiment. On the other hand, a pair of locking members, i.e., locking claws 121, 121 formed at the locking portion 17a of the moving member 17 are vertically staggered from each other by ½L (a half pitch).

Also in the lock device of this modification, the moving member 17 can perform the regular sliding in one direction, i.e., in the downward direction as in the second embodiment, but the reverse sliding of the moving member 17 in the other direction, i.e., in the upward direction is locked by the engagement between the locking claws 121, 121 and the locking grooves 120, 120. Because the distances L between the locking grooves 120, 120 of the left and right locking groove groups 120G, 120G are vertically staggered from each other by the half pitch ½L, any one of the left and right locking claws 121, 121 is locked at up to ½ distance (half pitch), i.e., ½L by one of the left and right locking grooves 120, 120, when the moving member 17 slides regularly in the upward direction. Therefore, the moving member 17 is prevented from sliding in the reverse or opposite at a short interval, as in the second embodiment.

Although the embodiments of the present invention have been described in detail, the present invention is not limited to the above-described embodiments, and various embodiments may be made within the scope of the invention.

The case where the present invention is applied to a seat belt device of a vehicle has been described in the embodiments, but it is needless to say that the present invention may be applied to any other device.

What is claimed is:

1. A lock device of a sliding mechanism, said lock device comprising:

a guide rail extending along a longitudinal axis;

a moving member adapted to slide in a first direction along the guide rail, said moving member comprising a block body having two spaced apart recesses formed therein, each of said recesses containing a spring;

at least a pair of locking members provided with the moving member, each of said locking members disposed in one of the recesses of the moving member and being reciprocally movable therein along a movement axis in a direction substantially perpendicular to the longitudinal axis of the guide rail, each of said locking members further having an inclined contact face disposed at an angle with respect to the movement axis of the locking member, and having a locking edge spaced, in the first direction, a distance S from a locking edge of an immediately adjacent locking member; and an elongated locking rail disposed parallel to the guide rail, the locking rail having a serrated configuration in which a group of locking grooves are formed therein and interspersed with a plurality of projecting teeth arranged in the first direction of the moving member, wherein each of said projecting teeth includes a locking face and an inclined slide face, and wherein each groove of the group is separated from an immediately adjacent groove by a distance L;

wherein the locking edges of the locking members are configured to selectively engage with different ones of the locking faces of said projecting teeth adjacent said locking grooves to lock the moving member in various engagement positions when the moving member slides in a second direction opposite the first direction along the guide rail, wherein the distance S is not a multiple of the distance L such that the moving member becomes locked in one of the engagement positions on the guide rail after moving an interval smaller than the distance L in the second direction.

2. A lock device of a sliding mechanism according to claim 1, wherein the moving member includes a retractor of a seat belt device of a vehicle.

3. A lock device of a sliding mechanism according to claim 1, wherein the distance S is approximately 50% larger than the distance L.

4. A lock device of a sliding mechanism, said lock device comprising:

a guide rail having a non-circular cross-sectional shape and extending along a longitudinal axis;

a moving member adapted to slide in a first direction along the guide rail, said moving member comprising a block body having a guide groove formed therein with a second cross-sectional shape configured to slidably receive the guide rail therein to permit slidable movement of said moving member in relation to said guide rail, said block body further having two spaced apart recesses formed therein, each of said recesses containing a spring;

at least a pair of locking members provided with the moving member, each of said locking members disposed in one of the recesses of the moving member and being reciprocally movable therein along a movement axis in a direction substantially perpendicular to the longitudinal axis of the guide rail, each of said locking members further having a contact face disposed at an acute angle with respect to the movement axis of the locking member, and having a locking edge spaced, in the first direction, a distance S from a locking edge of an immediately adjacent locking member; and an elongated locking rail disposed parallel to the guide rail, the locking rail having a serrated configuration in which a group of locking grooves are formed therein and interspersed with a plurality of projecting teeth arranged in the first direction of the moving member, wherein each of said projecting teeth includes a locking face and an inclined slide face, and wherein each groove of the group is separated from an immediately adjacent groove by a distance L, wherein said locking members are slidably movable past said projecting teeth when said moving member moves in said first direction via contact between said inclined slide faces of said projecting teeth and said contact faces of said locking members;

wherein the locking edges of the locking members are configured to selectively engage with different ones of the locking faces of said projecting teeth adjacent said locking grooves to lock the moving member in various engagement positions when the moving member slides in a second direction along the guide rail, said second direction being substantially opposite to said first direction;

wherein the distance S between the pair of locking members is longer than the distance L between adjacent ones of the locking grooves, such that the moving member becomes locked in one of the engagement positions on the guide rail after moving an interval smaller than the distance L in the second direction.

* * * * *